March 27, 1962     ÖRNULF E. HEIBERG     3,027,069

MECHANICAL ANALOG COMPUTER

Filed March 28, 1957     2 Sheets-Sheet 1

INVENTOR
ÖRNULF E. HEIBERG

BY
*Boonie, Edmonds, Morton,*
*Barrows & Taylor* ATTORNEYS

March 27, 1962  ÖRNULF E. HEIBERG  3,027,069
MECHANICAL ANALOG COMPUTER

Filed March 28, 1957  2 Sheets-Sheet 2

INVENTOR
ORNULF E. HEIBERG
BY
ATTORNEYS

United States Patent Office 3,027,069
Patented Mar. 27, 1962

1

3,027,069
MECHANICAL ANALOG COMPUTER
Örnulf E. Heiberg, Charlottesville, Va., assignor to Institute of Textile Technology, Charlottesville, Va., a corporation of Virginia
Filed Mar. 28, 1957, Ser. No. 649,202
15 Claims. (Cl. 235—61)

This invention relates to computers, and more particularly to mechanical analog computers which reproduce a mathematical equation of a particular family or simultaneous systems of several such equations having one or more variables in common and which provide specific numerical solutions of such equations and systems of equations.

Many types of scientific and industrial activities are based upon processes which require one or more standard equations to be solved for particular numerical values many times over in the ordinary course of the work. Even though pencil and paper computation of a particular numerical solution may not be involved, it may be time consuming. The task becomes particularly tedious in situations which require that the same general equation or family of equations be solved often using different values of the variables involved. There are, of course, many mechanical methods for computing the values of expressions involving the sums or differences of two or more variables. There are also mechanical computers which are generally adapted to perform the other arithmetic operations of multiplication and division. While such general purpose machines may be, and commonly are, used to compute numerical values of standardized equations they are not particularly well adapted to the purpose, and they generally require a skilled operator to perform the several steps of the calculation in a properly ordered sequence. Moreover, because of their general applicability to all types of arithmetic calculations they cannot be adopted so efficiently to any particular equation as a more specialized instrument.

Where the nature of the scientific or industrial activity is such that certain mathematical expressions become standardized and their exact numerical values must be computed many times over, it is desirable to have a computer especially adapted to the particular equation involved and to the numerical ranges of the variables likely to be encountered. A particular type of expression frequently encountered, either alone or as a factor, is that involving the product of two or more independent variables where one or more of the variables is raised to an integral or fractional power. Expressions of this kind are often found in such general fields as thermodynamics and mechanics and in the more specialized fields such as textile production. Numerical values of such products may be computed with the aid of a conventional slide rule. However, this generally requires a skilled operator who must follow an especially ordered procedure and the only way of checking the results is to repeat the entire computation.

I have invented a mechanical analog computer which in its basic form reproduces the relationship between the variables A, B, C, . . . in many equation convertible to the general type $A \cdot B^b \cdot C^c \ldots =$ constant, where the exponents $b, c, \ldots$ may have any constant positive or negative values, either integral, fractional or irrational. This general expression comprehends a large family of specific equations of great practical usefulness. Since the exponent for each of the variables is assumed to differ from zero, an equation of this type can always be written in such a form that the exponent for any one preselected variable becomes 1. As an arbitrary convention to facilitate the description of my invention, it may be assumed that A is the dependent variable, and that the exponent for A is 1.

According to my invention, I provide a continuously variable or movable mechanical input means for each variable of the particular expression, to which means there is coupled a graduated indicating means for relating the variation or motion of the input means to the logarithm of the particular value of the variable. I also provide a variable or movable output element having a logarithmically graduated indicating means coupled thereto. The movable input and output elements are coupled together by trains of mechanical elements for altering the variation or motion produced by the input means in accordance with predetermined ratios, and of differential transmission means for combining in predetermined proportions the altered displacements of the several input means, to the end that the resultant of the displacements of the input means finally is indicated by the graduated means associated with the output means.

The general principle upon which my invention is based is that a change in one variable of the general expression given above necessitates a change in one or more of the other variables. Assume for the moment that the variables A and B are the only ones that are changing. The general equation will then be reduced to $A \cdot B^b =$ constant. The symbol $M(B, A)$ may represent the ratio of the change in the logarithm of the variable A to the change in the logarithm of the variable B, i.e., the ratio of the change in the displacement of the output element for A to the change in the displacement of the input element for B. Mathematically the ratio $M(B, A)$ is the negative ratio of the respective exponents for the two variables, i.e.

$$M(B, A) = \frac{\Delta \log A}{\Delta \log B} = -\frac{b}{1} = -b$$

The mathematical validity of this equality may be demonstrated as follows:

$$A_1{}^a B_1{}^b = \text{Constant} = K$$

likewise, $$A_2{}^a B_2{}^b = K$$

Then, $$a \text{ Log } A_1 + b \text{ Log } B_1 = \text{Log } K$$

and, $$a \text{ Log } A_2 + b \text{ Log } B_2 = \text{Log } K$$

Therefore, $a \text{ Log } A_1 + b \text{ Log } B_1 = a \text{ Log } A_2 + b \text{ Log } B_2$
$b[\text{Log } B_1 - \text{Log } B_2] = a[\text{Log } A_2 - \text{Log } A_1]$
$-b[\text{Log } B_2 - \text{Log } B_1] = a[\text{Log } A_2 - \text{Log } A_1]$ $$-\frac{b}{a} = \frac{\text{Log } A_2 - \text{Log } A_1}{\text{Log } B_2 - \text{Log } B_1}$$

I have previously defined the function, $M(B, A)$, as follows:

$$M(B, A) = \frac{\text{Log } A_2 - \text{Log } A_1}{\text{Log } B_2 - \text{Log } B_1}$$

Therefore, $$M(B, A) = -\frac{b}{a}$$

When the exponent $a$ has the value 1, then $$M(B, A) = -\frac{b}{1} = -b$$

Physically the ratio $M(B, A)$ is reproduced as the overall transmission ratio in the train of mechanical elements coupling the input element for the variable B to the output element for the variable A. It is apparent that similar ratios may be computed for any other pair of variables, i.e.

$$M(B, C) = \frac{b}{c}$$

etc.

As a particular embodiment of my invention a computer may be built to reproduce any particular equation involving the product of two or more independent variables with constant positive or negative fractional or integral exponents.

A number of the basic units of the computer I have invented may be combined to reproduce two or more simultaneous equations of the above-mentioned type, each of which has at least one variable in common with at least one of the others. Provided only that the indicating means for the several variables have appropriate ranges, a computer according to my invention will continuously solve the expression for any numerical values of the variables. By the use of special scale graduations the variables may be transformed in various manners as they enter into the computer or as they emerge from it. A feature of my invention is that it will equally well indicate the values of the independent variables for each particular value of the dependent variable. Of great significance is the fact that the operation of the computer according to my invention requires no particular ordered sequence of operations. Moreover, the particular values of the variables are always apparent to the operator and provide means for instantly checking the accuracy of the computation.

In the following specification I give a detailed description of a preferred embodiment of my invention to enable one skilled in the art to completely understand its principles and features. In the course of this description reference is had to the accompanying drawings, in which.

The particular computer which I have chosen to illustrate my invention is one based on the set of twist and production equations of the Universal Percent Twist System which is a new method of expressing the amount of twist in textile yarns. The word "yarn" is here used in an extended sense to include single yarns as spun on a spinning frame, ply-yarns being twisted on a twister, and rovings as prepared on a roving frame.

Whenever two yarns of different number are made from the same textile material to be used for the same purpose, their construction must in some way be made equivalent. The twist of the yarn may be related to the yarn count in weight per unit length or length per unit weight by a principle of equivalence which may take the form of a mathematical formula. For many years the well-known square root formula has been widely used for this purpose. In any indirect yarn count system, such as Cotton or Worsted, this formula may be written as $X = m \cdot N^{1/2}$ where X is the nominal or actual turns per inch, N is the yarn number and $m$ is the square root multiplier. However, it has been recognized that the square root formula is very inaccurate. Experience has shown that if it is desired to make a series of equivalent yarns, differing in number only, it is usually necessary to increase the value of the multiplier $m$, with increasing yarn count N. This indicates that an exponent for the yarn count greater than one-half might have given better results.

The Universal Percent Twist System discards the square root formula and adopts another function of the yarn number based on a more rational concept in order to obtain the desired equivalence. A careful study of the available evidence has led to the conclusion that a value of two-thirds is as close to a universally correct value of the exponent of the yarn number as is possible. Therefore, in the Universal Percent Twist System the conventional square root formula is replaced by a new twist equation, namely $X = a \cdot N^{2/3}$. To arrive at a measure of twist independent of the yarn numbering system, the twist coefficient $a$ is written as a product of two factors $a = p \cdot I$, where $p$ is the Percent Twist as a decimal fraction, and I is the System Factor. The value of I is adjusted to each yarn numbering system so that the Percent Twist $p$ remains invariant from one yarn numbering system to another. Thus the twist equation in the new system becomes $X = p \cdot I \cdot N^{2/3}$.

To give this new expression practical significance for any of the many different yarn numbering systems in use in the textile industry it is only necessary to fix arbitrarily the value of the System Factor I in any particular system. Arbitrarily, twenty-four turns per inch has been designated by definition as being 100 percent twist for 36s Cotton count. From this definition follows the value of the System Factor for the Cotton numbering system;

$$I = \frac{X}{p \cdot N^{2/3}} = \frac{24}{1.0 \cdot (36)^{2/3}} = 2.201285$$

The determination of the System Factor for all other yarn numbering systems then becomes a matter of simple substitution.

The importance of the innovations of this new system, which leads to greater accuracy and predicability, is apparent in view of the fact that decisions pertaining to the amounts of twist to be used in a roving or a yarn are among the most frequent and most important decisions made in any textile mill.

For purpose of twist and production computations which must be made constantly in a textile mill the following equations are basic to the Universal Percent Twist System. For indirect yarn count systems, such as Cotton, Worsted, or Metric, the equations are:

$$K = X \cdot t$$
$$X = p \cdot I \cdot N^{2/3}$$
$$K = p \cdot t \cdot I \cdot N^{2/3}$$
$$X = m \cdot N^{1/2}$$
$$m = p \cdot I \cdot N^{1/6}$$
$$n \cdot E \cdot S \cdot H = 63 \cdot \sqrt{6} \cdot p \cdot I^{5/2} \cdot N^{5/3} \cdot Y$$

These equations may also be used with the direct yarn numbering systems, such as Tex or Denier, provided the exponent for the yarn number N is given a negative sign, the equations otherwise being written as above. In these equations the symbols have the following meaning: N is the yarn number in any system; I is the System Factor for any system, either direct or indirect; $p$ is the Percent Twist as a decimal fraction; $m$ is the multipler in the conventional square root twist formula; X is the nominal twist in turns per inch, i.e., the number of spindle revolutions per inch of material delivered by the front rolls of the machine; K is the twist constant for the machine; $t$ is the number of teeth in the twist change gear; $n$ is the spindle speed in revolutions per minute; E is the percent efficiency which is introduced in the equations as the equivalent decimal fraction; S is the number of spindles; H is the number of production hours; Y is the number of pounds of production.

The particular computer I have chosen to illustrate my invention is constructed to solve the set of equations given above for the indirect Cotton yarn numbering system, for which the System Factor I is 2.201285 when the twist is given in turns per inch. The System Factor, and other numerical factors appearing in the equations, are set into this particular computer after it has been assembled. This procedure will be described in detail later. The distinction between dependent and independent variables is an arbitrary one. Generally, the most common factors to be determined in textile mill computations are the number of teeth in the twist change gear $t$; the nominal twist in turns per inch X; the multiplier in the conventional square root twist formula $m$; and the number of pounds of production Y. On the other hand, the factors most commonly known to the person in charge of production are the twist constant of the machine K; the yarn count N; the Percent Twist $p$; the spindle speed $n$; the efficiency E; the number of spindles to be used S; and the number of production hours available H. Therefore, I have selected K, N, $p$, $n$, E, S, and H as the independent variables, whereas $t$, X, $m$, and Y have been selected as the dependent variables.

Figure 1:
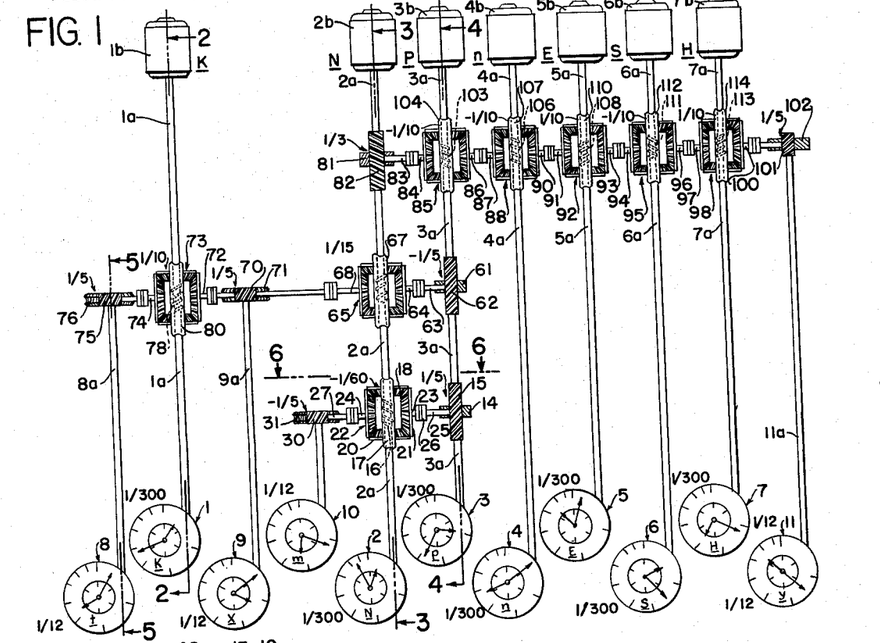
FIG. 1 is a partially schematic layout of a mechanical analog computer.
Figure 7:
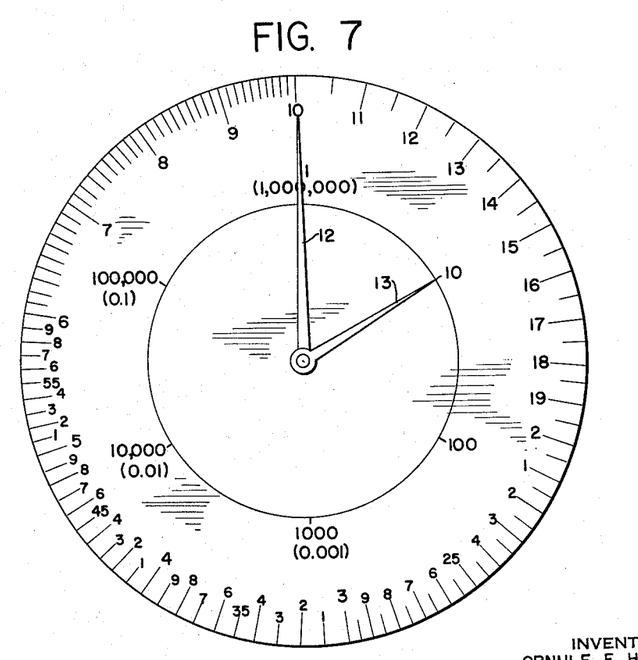
FIG. 7 is an illustration of the face of a logarithmically graduated dial to be used in conjunction with the computer of FIG. 1.

In all, there are eleven such variables and, as shown in FIG. 1, there is a separate indicating means for the value of each variable. In this embodiment, each indicating means is a logarithmically graduated clock. The clocks for the independent variables are indicated at 1 through 7, respectively, and the clocks for the dependent variables are indicated at 8 through 11, respectively. All of the clock dials are identical and their appearance is shown in detail in FIG. 7. The periphery of the dial is graduated logarithmically from 1 to 10 with appropriate subdivisions, 1 and 10 being represented by the same point on the circular scale. A smaller concentric scale is graduated from 1 to 1,000,000, 1 and 1,000,000 being represented by the same point. The point representing 100,000 may also represent 0.1, the 10,000 point may represent 0.01, and so forth. The long indicating hand 12 indicates the numerals of the variable, while the short hand 13, which makes only one revolution for every six revolutions of the long hand, indicates the decimal point. The mechanisms of the clocks are reducing gear trains, the constructions and functions of which will be described later.

The computer is provided with means for independently driving each of the independent variable clocks to any desired value within the available range. The means I employ for this purpose in this embodiment are small electric motors 1b–7b, incl., for the clocks 1–7, respectively. Preferably these motors are the reversible type and separate energizing circuits (not shown) are provided so that each motor may be caused to run in either direction at will. The motors are connected to their clocks through shafts 1a–7a, respectively.

I have found it convenient to mount the components of the computer in a suitable cabinet with the clocks arranged in an external wall thereof substantially in the positions shown. All of the shafts 1a–7a connecting the motors to the clocks are preferably mounted in the same plane inside the cabinet.

For the purpose of this description it may be assumed that in FIG. 1 all the motor shafts 1a–7a are parallel to the plane of the paper, and that likewise the cross shafts connecting the differential gears are parallel to the paper. The clocks are assumed to lie face up.

With further reference to FIG. 1, the positive direction of any shaft or gear will be defined as the clockwise direction when viewed from the right, from the bottom, or from above the plane of the drawing. The opposite direction of rotation will be called negative. The transmission ratio between any two shafts will be considered positive if their rotations are either both positive or both negative. A transmission ratio which reverses the directional sign of the rotation will be considered negative.

It is easier to follow the description of the gearing if it is remembered that all rotary motion originates in the motors, and that in each separate transmission element the faster shaft is always driving the slower shaft. The only exception to this rule is that when the sun wheel of a differential gear is driving a side shaft, the sun wheel is the slower of the two.

Consider first that portion of the computer which is adapted to reproduce the equation $m = p \cdot I \cdot N^{\frac{1}{6}}$. As previously stated the System Factor, I, for any particular yarn count system, is a constant factor, and as such it is set into the instrument by a simple adjustment of the clock hands only after the instrument has been assembled. Therefore, the instrument must actively respond only to the independent variables $p$ and N, which alone determines the value of the dependent variable $m$. For the present purpose it is convenient to write the equation in the form $m^{-1} \cdot p \cdot N^{\frac{1}{6}} =$ constant, from which the transmission ratios $M(p, m) = 1$ and $M(N, m) = 1/6$, may be deduced directly. As the description of the trains of transmission elements proceeds, it will be seen that the transmission ratios do in fact have the specified values.

Figure 6:
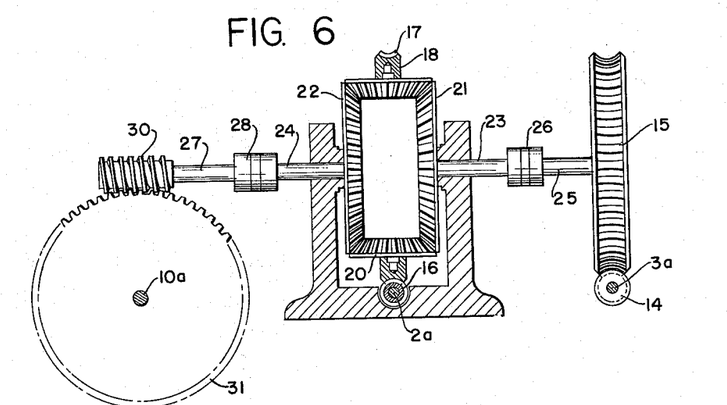
FIG. 6 is a sectional view taken along the line 6—6 of FIG. 1.

As shown in FIG. 1 and FIG. 6, the shaft 3a for the variable $p$ has a worm 14 fixed thereto. This worm cooperates with a gear 15 mounted above the shaft 3a and the combination provides a transmission ratio of 5 to 1. This ratio is indicated by the notation 1/5 to the upper left of the gear in FIG. 1 and is to be understood to mean that five revolutions of the driving worm 14 results in one revolution of the driven member—in this case, the gear 15. Transmission ratios for the other gear combinations of the computer are indicated at similar locations in the drawing.

The shaft 2a for the variable N has fixed thereto a worm 16 which cooperates with a gear 17 as best seen in FIG. 6. The reduction ratio of this combination is $-1/60$, that is to say for every sixty clockwise revolutions of the driving shaft 2a and worm 16 the gear 17 makes one revolution counterclockwise when viewed from the right of FIG. 1 in accordance with the above rules.

The gear 17 is a component of a gear differential. Planetary gears 18 and 20 are mounted internally of the sun gear for rotation about axes which are radii of the gear 17. A pair of crown gears 21 and 22 cooperate with the gears 18 and 20 and drive, or are driven by, side shafts 23 and 24, respectively. The shaft 23 is coupled to the shaft 25 of the gear 15 by means of a semi-rigid coupling 26 of any suitable type. Similar couplings are used throughout the computer wherever it is desirable to obviate the need for precise axial alignment of driving and driven members.

The side shaft 24 of the gear differential is coupled to a shaft 27 by coupling 28 and this latter shaft carries a worm 30 which cooperates with a gear 31. The latter gear is mounted on the input shaft 10a of the clock 10 for the dependent variable $m$. The worm 30 and gear 31 combination provides a reduction ratio of $-1/5$ between the shaft 27 and the shaft 10a.

Figure 2:
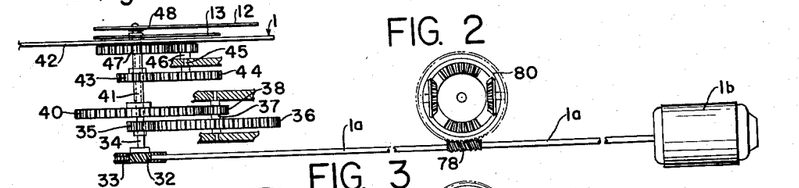
FIG. 2 is a sectional view taken along the line 2—2 of FIG. 1.
Figure 3:
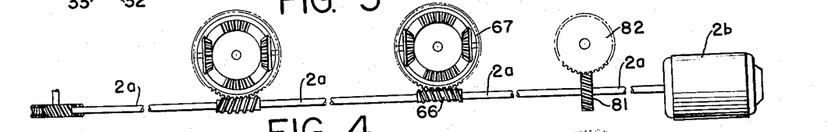
FIG. 3 is a sectional view taken along the line 3—3 of FIG. 1.

All the clocks are alike, except that those for the independent variables K, N, $p$, $n$, E, S, H, have reduction ratios of 1/300, while those for the dependent variables $t$, X, $m$, Y, have reduction ratios of 1/12. The clock gear train shown in FIG. 2 is typical even though it specifically illustrates the clock gear train for the independent variable K. The shaft 1a carries the worm 32 which cooperates with the gear 33 fixed to the shaft 34. The long hand 12 is fixed to the top of shaft 34 by means of a screw in such a manner that the hand may be adjusted in relation to the shaft by loosening the screw, and subsequently after the adjustment has been completed the hand may again be firmly fixed to the shaft by tightening the screw. The shaft 34 also carries a 12T pinion gear 35 in mesh with the 36T gear 36. Shaft 37, driven by gear 36, carries a 16T pinion gear 38 in mesh with the 32T gear 40. The gear 40 is attached to the sleeve 41 which turns freely on shaft 34. The short hand 13 is attached to the sleeve 41. In the case of the variables $t$, $X$, $m$, $Y$, $N$, provisions are made for the possibility of adjusting the position of the short hand 13 in relation to the sleeve 41. For the other variables no such adjustment is ever needed. As may be seen from the gear ratios, the short hand 13 will always turn one revolution for every six revolutions of the long hand 12.

Figures 4, 5:
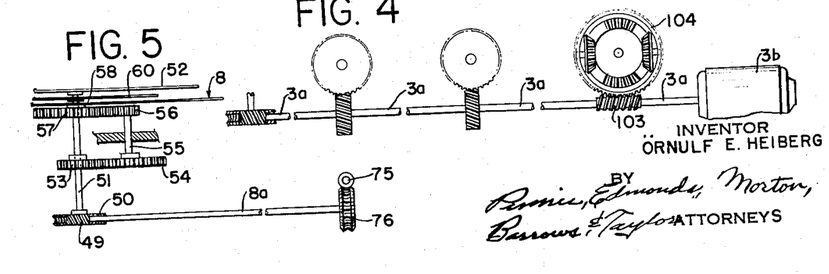
FIG. 4 is a sectional view taken along the line 4—4 of FIG. 1.
FIG. 5 is a sectional view taken along the line 5—5 of FIG. 1.

A 1/12 reduction gear train typical of the independent variable clocks is shown in FIG. 5 which specifically illustrates a cross-section taken along the line 5—5 of the drive mechanism for the clock indicating the value of the independent variable $t$. Here the shaft 8a drives a worm 49 which cooperates with a gear 50 mounted on the main shaft 51 of the clock 8. This worm and gear combination effects the requisite 1/12 reduction ratio. Therefore, the long hand 52 of this clock is connected directly to the shaft 51.

The main shaft also carries a pinion 53 which cooperates with the gear 54 mounted on shaft 55. This latter shaft drives another pinion 56 cooperating with gear 57 mounted on a sleeve 58, the sleeve being coaxial with the main shaft 51. The hand 60 of this clock is mounted on the sleeve 58. Beginning with the pinion 53, the gear train further reduces the revolutions of the main shaft 51 by a 1/6 ratio so that the short hand 60 makes one revolution for each six revolutions of the long hand 52.

As stated, the gear trains illustrated in FIG. 2 are typical of the gear trains of each of the clocks for indicating the values of the dependent variables $K$, $N$, $p$, $n$, $E$, $S$, and $H$. Similarly, the gear trains in FIG. 5 are typical of the clocks for indicating the values of the independent variables $t$, $X$, $m$, and $Y$. Throughout the remainder of the description of the computer mechanisms the specific clocks will not be separately described in detail.

Returning now to the mechanism described to reproduce the equation $m^{-1} \cdot p \cdot N^{1/6} =$ constant, it is known that a gear differential is characterized by the fact that the angular displacement of the sun gear 17, which displacement will be designated $d_2$, is the means of the angular displacements of the two side shafts which will be designated $d_1$ and $d_3$, respectively; thus $d_2 = \frac{1}{2}(d_1 + d_3)$. Therefore, if one of the side shafts is held motionless, i.e., $d_3 = 0$, then $d_1 = 2d_2$ or if $d_1 = 0$ then $d_3 = 2d_2$. This means that the angular displacement of the sun gear 17 undergoes a multiplication of 2 as it is transmitted through the differential to either one of the side shafts while the other side shaft is held stationary. Of course, this is a unilateral transmission inasmuch as no motion can be transmitted from one of the side shafts back through the differential and the sun gear to the worm on the drive shaft. From the relations given above it is also clear that if the sun wheel is motionless, i.e., $d_2 = 0$, then $d_1 = -d_3$. This means that any angular displacement imparted to one of the side shafts is transmitted through the differential gear to the other side shaft, without any reduction or multiplication, and only undergoes a reversal of the direction of rotation; specifically, if the side shaft 23 is rotating in the clockwise direction when viewed from the right in FIG. 1 or FIG. 6, then the side shaft 24 will rotate in a counterclockwise direction when viewed from the same side in these figures.

The equation $m^{-1} \cdot p \cdot N^{1/6} =$ constant calls for a value of the ratio $M(p, m)$ equal to 1. Consequently, the mechanical transmission elements must be selected so that, with the other variables at rest, one complete revolution of the long hand on the clock for the variable $p$ will result in one complete revolution in the same direction of the long hand on the clock for the variable $m$. An analysis of the gearing will show that this is indeed the case.

Since the shaft 3a is geared to the long hand of the clock for the variable $p$ in the ratio 1/300, it takes 300 positive revolutions of the shaft 3a to produce one positive revolution of the long hand of the $p$-clock. Since the worm 14 in mesh with the gear 15 gives a reduction of 1/5, the 300 revolutions of the shaft 3a results in 60 revolutions of the crown gear 21. Passing through the differential the directions of the motion is reversed to become $-60$ revolutions of the crown gear 22 to which the worm 30 is attached. Since the worm 30 in mesh with the gear 31 gives a reduction of $-1/5$, the $-60$ revolutions of the crown gear 22 results in 12 revolutions of the shaft 10a leading to the clock 10 for the variable $m$, and, as this clock has a reduction ratio of 1/12, the long hand on the $m$-clock will make one positive revolution as a result of the 300 revolutions of shaft 3a corresponding to one revolution of the long hand on the $p$-clock. In condensed form these statements may be written $M(p, m) = 300 \cdot 1/5 \cdot (-1) \cdot (-1/5) \cdot 1/12 = 1$. It is thus seen that the mechanical elements do indeed give the value of the ratio $M(p, m)$ that the equation calls for.

Similarly the equation $m^{-1} \cdot p \cdot N^{1/6} =$ constant calls for a value of $M(N, m) = 1/6$, which is obtained as follows: One revolution of the long hand on the N-clock corresponds to 300 revolutions of the shaft 2a. The worm 16 in mesh with the gear 17 gives a reduction of $-1/60$ resulting in $-5$ revolutions of the sun wheel assembly attached to the gear 17 and carrying the planetary gears 18 and 20. Transferred to the crown gear 22 which drives the worm 30, the motion is multiplied by 2 and becomes $-10$ revolutions. The ratio of $-1/5$ of the worm 30 in mesh with gear 31 results in 2 revolutions of the shaft 1a, equivalent to $2 \cdot 1/12 = 1/6$ revolutions of the long hand on the $m$-clock. Therefore $$M(N, m) = 300 \cdot (-1/60) \cdot 2 \cdot (-1/5) \cdot 1/12 = 1/6$$

as required by the equation.

The operation of the remaining portions of the computer is typified by the operation of the parts just described in detail. The equation $X = p \cdot I \cdot N^{2/3}$, which for the present purpose more conveniently may be written $$X^{-1} \cdot p \cdot N^{2/3} = \text{constant}$$

requires the transmission ratios $M(p, X) = 1$, $$M(N, X) = 2/3$$
$$M(N, m) = 300 \cdot (-1/60) \cdot 2 \cdot (-1/5) \cdot 1/12 = 1/6$$

In this case the shaft 3a drives a worm 61 which cooperates with a gear 62 to effect a transmission ratio of $-1/5$ between the shaft 3a and the shaft 63, and the latter shaft drives one side shaft 64 of gear differential 65.

Shaft 2a has fixed thereto a worm 66 which cooperates with a sun gear 67, carrying the pinions of the gear differential 65, and the transmission ratio is 1/15 as indicated in FIG. 1. The output of the differential 65 is the side shaft 68 which drives a worm 70 and gear 71 combination having a transmission ratio of 1/5. The gear 71 is fixed to shaft 9a which, in turn, drives the gear train of clock 9 for the dependent variable $X$. Since the gear train in this clock provides a reduction ratio of 1/12, it is seen that $$M(p, X) = 300 \cdot (-1/5) \cdot (-1) \cdot 1/5 \cdot 1/12 = 1$$

and $$M(N, X) = 300 \cdot 1/15 \cdot 2 \cdot 1/5 \cdot 1/12 = 2/3$$

as required by the equation.

The equation $K = p \cdot t \cdot I \cdot N^{2/3}$ may for the present purpose be written $K^{-1} \cdot p \cdot t \cdot N^{2/3} =$ constant, where $t$ is considered the dependent variable. This equation requires $M(K, t) = 1$, $M(p, t) = -1$, $M(N, t) = -2/3$, which are obtained as follows: In addition to being transmitted to the shaft 9a through the worm 70 and gear 71 combination, the rotation of shaft 68 is also transmitted directly to one side shaft 72 of another gear differential 73. While undergoing a change in direction of rotation they are transmitted through this differential to the side shaft 74 which is coupled to the worm 75 cooperating with the gear 76 as seen in FIG. 5. The latter gear is fixed to the shaft 8a which drives the gear train of the clock 8 for the dependent variable t.

Angular displacements of the shaft 1a which are related to the value of the independent variable K drive the worm 78 and gear 80 combination (see FIG. 2) which has a transmission ratio of 1/10. The gear differential 73 multiplies the number of revolutions of the sun gear 80 by 2, as previously explained. From these gear ratios follow:

$$M(K, t) = 300 \cdot 1/10 \cdot 2 \cdot 1/5 \cdot 1/12 = 1$$
$$M(p, t) = 300 \cdot (-1/5) \cdot (-1) \cdot (-1) \cdot 1/5 \cdot 1/12 = -1$$
$$M(N, t) = 300 \cdot 1/15 \cdot 2 \cdot (-1) \cdot 1/5 \cdot 1/12 = -2/3$$

as required by the equation.

The right-hand portion of the computer as shown in FIG. 1 reproduces the equation $$n \cdot E \cdot S \cdot H = 63 \cdot \sqrt{6} \cdot p \cdot I^{5/2} \cdot N^{5/3} \cdot Y$$

which for the present purpose may be written $N^{5/3} \cdot p \cdot n^{-1} \cdot E^{-1} \cdot S^{-1} \cdot H^{-1} \cdot Y = \text{constant}$, where Y is considered the dependent variable. The equation calls for the following transmission ratios $M(Y, N) = -5/3$, $M(Y, p) = -1$, $M(Y, n) = 1$, $M(Y, E) = 1$, $M(Y, S) = 1$, $M(Y, H) = 1$, which are obtained as follows: Shaft 2a drives a worm 81 and gear 82 combination having a transmission ratio of 1/3. The gear 82 is fixed to a shaft 83 coupled to the side shaft 84 of gear differential 85. The rotation of shaft 83 is transmitted to the side shaft 86 which is, in turn, coupled to the side shaft 87 of gear differential 88, the operation of the gear differential causing a reversal in direction of the rotation of the shaft. The rotation of the side shaft 87 is transmitted through the gear differential 88 to the other side shaft 90 which is coupled to side shaft 91 of gear differential 92. Again, the direction of rotation undergoes a reversal of direction. The rotations of side shaft 91 are transmitted through the differential 92 to the side shaft 93 while undergoing a change in direction and are coupled to the side shaft 94 of gear differential 95. Once more the rotations of shaft 94 undergo a reversal of sign as they are transmitted to the other side shaft 96 of gear differential 95. Shaft 96 is coupled to side shaft 97 of gear differential 98 and the direction of rotation is once again changed as the motion is transmitted to the side shaft 100. The latter side shaft is coupled to the shaft of worm 101 which cooperates with gear 102. This worm and gear combination has a reduction ratio of 1/5. The latter gear is fixed to shaft 11a which drives the gear train for clock 11 for the dependent variable Y. The gear train of clock 11 has a reduction ratio of 1/12. These gear ratios give $$M(N, Y) = 300 \cdot 1/3 \cdot (-1)^5 \cdot 1/5 \cdot 1/12 = -5/3$$

The shaft 3a drives the worm 103 and gear 104 combination having a transmission ratio of −1/10. The rotation of sun gear 104 is transmitted to side shaft 86 of gear differential 85 with a multiplication factor of 2 and is then transmitted through each of the gear differentials 88, 92, 95, and 98 to the worm 101 and gear 102, resulting in $$M(p, Y) = 300 \cdot (-1/10) \cdot 2 \cdot (-1)^4 \cdot 1/5 \cdot 1/12 = -1$$

In like manner, shaft 4a, which drives the clock 4 for the independent variable n, drives a worm 106 and gear 107 combination having a reduction ratio of −1/10. While undergoing a multiplication of 2 the rotations of the gear 107 are transmitted to the gear differential side shaft 90 and subsequently through the gear differentials 92, 95, and 98 to the worm 101 and gear 102 combination and thence through the shaft 11a to the clock 11, resulting in $$M(n, Y) = 300 \cdot (-1/10) \cdot 2 \cdot (-1)^3 \cdot 1/5 \cdot 1/12 = 1$$

Similarly: Shaft 5a driving the worm 108 and gear 110 combination having a transmission ratio of 1/10, gives $$M(Y, E) = 300 \cdot 1/10 \cdot 2 \cdot (-1)^2 \cdot 1/5 \cdot 1/12 = 1$$

Shaft 6a driving the worm 111 and gear 112 combination having a transmission ratio of −1/10, gives $$M(Y, S) = 300 \cdot (-1/10) \cdot 2 \cdot (-1) \cdot 1/5 \cdot 1/12 = 1$$

Shaft 7a driving the worm 113 and gear 114 combination, having a reduction ratio of 1/10, gives $$M(Y, H) = 300 \cdot 1/10 \cdot 2 \cdot 1/5 \cdot 1/12 = 1$$

As previously stated the System Factor I and other numerical factors contained in the equations are introduced into this embodiment of my invention only after the instrument has been assembled. The adjustments are carried out as follows: On each of the clocks for the independent variables K, N, p, n, E, S, H, the long hand 12 is first adjusted correctly in relation to the short hand 13 in such a manner that if the short hand exactly indicates either 1, 10 or 100, etc., the long hand will simultaneously indicate exactly 1. The clocks are then set for an arbitrarily selected set of values of the independent variables K, N, p, n, E, S, H, from which the corresponding values of the dependent variables t, X, m, Y, are calculated by conventional means of computation. The long and the short hands on each of the clocks for the dependent variables are set for the values of these variables so calculated, and are then locked in place in relation to the shafts 34 and sleeves 41, respectively. This completes the adjustment.

If it is desired to change from one yarn numbering system to any other yarn numbering system, the readjustment may be accomplished by readjusting only the hands on the N-clock, provided the two numbering systems are either both direct or both indirect. In order to change from a direct to an indirect system, or reverse, the sign of the reduction ratio of the N-clock must be reversed. This may be accomplished by the insertion of an idler gear in the clock gear train, or by equivalent means. The direction in which the rotation of the motor 2b for the variable N responds to the manipulation of the electric controls must also be reversed.

Now the operation of the computer may be illustrated in arithmetic terms with the aid of the rules given above for denoting positive and negative directions of rotation and positive and negative transmission ratios. For particular values of p and N the computer will solve the equation $m = p \cdot I \cdot N^{1/2}$ in the following manner. Assume as a starting point that the hands of the respective clocks are set to the graduation marks corresponding to $m = 1$, $p = 1$, $N = 1$. A number of revolutions of the motor 36 will drive the shaft 3a until the clock 3 indicates the particular value of the independent variable p. In fact, because of the 1/300 ratio of the p-clock gear train, the required number of revolutions of the shaft 3a will be equal to $300 \cdot \log p$. Similarly the number of revolutions required for the motor 2b will drive the clock for the independent variable N to the particular value and the number of revolutions required is equal to $300 \log N$. At the worm 14 and gear 15 combination the number of revolutions of the shaft 3a is effectively divided by 5 as the displacement of the shaft 3a is transmitted to the shaft 25. The transmission ratio of the worm and gear combination being positive, the direction of the displacement of the shaft 25 is clockwise. As explained above, the rotation of shaft 25 is transmitted through the gear differential to the shaft 27 with a change in direction so that the latter shaft rotates counter-clockwise. The displacement or rotation of shaft 27 now represents $(-1/5) \cdot 300 \cdot \log p$ revolutions. At the worm 30 and gear 31 combination the rotation of the shaft 27 undergoes a further reduction and reversal of direction in accordance with the transmission ratio of −1/5. Therefore the angular displacement of the shaft 10a due to the rotation of shaft 3a equals $(-1/5) \cdot (-1/5) \cdot 300 \cdot \log p$ revolutions. As the rotations of shaft 10a are transmitted through the gear train of the clock 10 they undergo a further reduction of 1/12. The displacement of the long hand of clock 10 due to the rotations of shaft 3a therefore equal $1/12 \cdot (-1/5) \cdot (-1/5) \cdot 300 \cdot \log p = \log p$ revolutions.

The rotation of the shaft 2a is transmitted to the m-clock 10 in the following manner and added to the indication thereon resulting from the rotation of shaft 3a. The worm 16 and sun gear 17 combination reduces the rotations of shaft 2a by −1/60 and, because the transmission ratio of the combination is negative, the sun gear rotates in the counter-clockwise direction. The rotation of the sun gear thus represents $(-1/60) \cdot 300 \cdot \log N$ revolutions. Now the shaft 25 and gear 21 are stationary, there being no further change in the value of the independent variable $p$, and the angular displacement of the sun gear due to rotation of shaft 2a is effectively multiplied by 2 as it is transmitted to the shaft 27. Thus, the rotation of shaft 27 due to the rotation of shaft 2a is equal to $2 \cdot (-1/60) \cdot 300 \cdot \log N$ revolutions. Proceeding along toward the clock 10, the rotation of shaft 27 is reduced by the transmission ratio −1/5 of the worm 30 and gear 31 combination and the direction of rotation is reversed. The displacement of the shaft 10a therefore becomes $(-1/5) \cdot 2 \cdot (-1/60) \cdot 300 \cdot \log N$. This displacement is further reduced by 1/12 by the gear train in the m-clock so that the displacement of the long hand of clock 10 due to the rotation of shaft 2a is $$1/12 \cdot (-1/5) \cdot (-1/60) \cdot 2 \cdot 300 \cdot \log N = 1/6 \log N$$

The combined displacement of the long hand of the m-clock 10 resulting from the rotations of the shafts 2a and 3a will therefore equal $(\log p + 1/6 \cdot \log N)$ revolutions. Since the hands for the respective clocks initially were set to indicate $m=1$ for $p=1$ and $N=1$, this combined displacement therefore equals $\log m$ revolutions. On account of the logarithmic graduation of the dial of the m-clock 10, the hands of this clock will therefore indicate the particular value of $m$ which solves the equation $m = p \cdot I \cdot N^{1/6}$. Although the foregoing explanation is in terms of a sequence of operations, the $p$ and $N$ clocks may be driven to their particular values simultaneously and the results will be identical.

The basic operation of the remaining portions of the computer are typified by the operation of the parts just described in detail, and the analysis of the operation of the computer to provide specific solutions of the other equations it reproduces may be made in exactly the same manner.

In accordance with the disclosed principles, the embodiment of my invention described above may be modified or expanded in many respects to adopt it to special situations. In some cases, for example, it may be desirable to introduce the front roll diameter of the yarn spinning machine as an additional independent variable in order to obtain the speed of this roll in revolutions per minute as another dependent variable. In other cases provisions may be made to enable the operator to change from any direct or indirect yarn numbering system to any other such system without readjustment of the computer. To this end the System Factor, I, may be introduced as an independent variable, and the N-clock may be equipped with two scales, one running in the opposite direction of the other.

At present I believe that toothed gearing provides the most accurate and reliable transmissions. However, other mechanical means may be utilized to the same end. Whatever the type of mechanical elements employed, it should be noted that arrangements must be made so that no movement of the hands on any of the clocks can occur as an accidental result of the movements of the various parts of the computer. Toothed gearing is desirable in this respect for the reason that the differential transmissions and the worm and gear combinations are essentially unilateral devices.

Precautions should also be taken to insure that the driving motors do not have any appreciable tendency to overrun when the power is cut off. Generally, small motors having low inertia will be best suited to this application.

A substantial advantage is derived from the high transmission ratios of the clock gear trains which minimizes the effect of any backlash in the differential gears. This makes it possible to use relatively inexpensive differential gears without any appreciable sacrifice of overall accuracy.

In the particular embodiment of my invention described above nothing will be changed if the short hand on the clock for any of the variables, except N, is made to complete any whole number of revolutions in the same direction. In the case of the variable N, however, the original situation will only be restored after a whole multiple of six revolutions of the short hand. To safeguard against the confusion which this condition might cause, suitable mechanical or electrical means may be employed to make it impossible for the short hand of the N-clock to pass an arbitrarily selected point of the scale, for example the point representing 10,000 or 0.01.

The principal feature of my new analog computer is that it takes the computational toil out of calculations of the type described. The operator does not need to give any attention whatsoever to the particular forms of the equations since they have been built into the computer. Moreover, there is no sequence of operations to be kept in mind, and there is no distinction to be made between the arithmetic operations of division and multiplication. Each one of the independent variables is set on its own separate dial, and the correct values of the corresponding dependent variables appear automatically, each on its own dial. The variables may be set in any order and any one of them may be changed afterwards.

My invention has been described in connection with an embodiment especially adapted to perform the twist and production calculations made in a textile mill. It is obvious, however, that a very large number of practical designs are possible. Therefore, I do not propose to be limited to the precise details set forth above. Generally, a computer may be designed in accordance with the principles I have given for all problems which may be reduced to one or more equations of the mathematical form $A \cdot B^b \cdot C^c \ldots = $ constant, where for the particular embodiment of my invention described above the exponents $b$, $c$ must be positive or negative, either integral or fractional. However, there are many other types of equations to which other modifications of my invention may be applied. For example, in the general equation given above the exponents $b, c, \ldots$ may have irrational values, and they do not necessarily need to be constant. Although the invention is based on the use of logarithmic scales, the scales may be modified to reproduce a large variety of trigonometric and other mathematical functions. For example, the exponential function $A \cdot B^z = $ constant, where not only A and B, but also the exponent $z$ are variables, may be reproduced by using a regular logarithmic scale for the exponent, $z$, and log-log scales for the variables A and B.

In general, I believe a computer of this new type can be used for the solution of any equations where the ratio of the logarithmic differential of the variable (above referred to as the M— ratios) can be produced by mechanical means.

Having fully described a particular embodiment of my invention, I claim:

1. Apparatus for evaluating a dependent variable A for particular values of one or more independent variables B, C . . ., the variables being related by an expression of the general form $A \cdot B^b \cdot C^c = $ constant, where at least one of the exponents $b, c$ . . . is rational or irrational and other than 1, which apparatus comprises a displaceable input element for each of the variables B, C . . ., means for producing a displacement of each input element related to the logarithm of the associated independent variable, a displaceable output element for the dependent variable A, means for relating the displacement of the output element to the value of the dependent variable A, and means for communicating the displacement of each input element to the output element, said communicating means operating to multiply the displacement of each input element by the negative ratio of the exponent of the independent variable associated with that input element to the exponent of the dependent variable and to sum algebraically the multiplied displacements.

2. Apparatus according to claim 1 in which the communicating means between the input element for the variable C and the output element comprises means for differentially combining the displacements transmitted from two of said input elements and means for transmitting the combined displacements to said output element.

3. Apparatus according to claim 1 in which the communicating means comprises first gear means for multiplying the displacement of a first input element, second gear means for multiplying the displacement of a second input element, differential gear means for algebraically summing the multiplied displacements produced by said first and second gear means, and means for transmitting the summed displacements to said output element, the overall transmission ratio of the communicating means between the input element for each independent variable and the output element for the dependent variable being equal to the negative ratio of the exponent of that independent variable to the exponent of the dependent variable.

4. Apparatus according to claim 1 in which the communicating means comprises first gear means for multiplying the displacement of a first input element, second gear means for multiplying the displacement of a second input element, differential gear means for algebraically summing the multiplied displacements produced by said first and second gear means, third gear means for multiplying the summed displacements produced by the differential gear means, and means for transmitting the multiplied displacement produced by said third gear means to said output element, the overall transmission ratio of the communicating means between the input element for each independent variable and the output element for the dependent variable being equal to the negative ratio of the exponent of that independent variable to the exponent of the dependent variable.

5. Apparatus for evaluating a dependent variable A for particular values of one or more independent variables B, C . . ., the variables being related by an expression convertible to the general form $A \cdot B^b \cdot C^c =$ constant, where at least one of the exponents $b, c \ldots$ is rational or irrational and other than 1, which apparatus comprises a displaceable input element for each of the variables B, C . . ., means for producing a displacement of each input element related to the logarithm of the value of the associated independent variable, a displaceable output element for the dependent variable A, means for relating the displacement of the output element to the value of the dependent variable, and means for communicating the displacement of each input element to the output element, said communicating means comprising a gear means for each input element for multiplying the displacement of that element, one differential gear means for algebraically summing the multiplied displacements produced by the gear means for two of said input elements, another differential gear means for algebraically summing the multiplied displacement produced by another of said gear means and the summed displacements produced by said one differential gear means, an additional differential gear means for each of the other gear means for algebraically summing the multiplied displacement produced by each other gear means and the summed displacements produced by the preceding differential gear means and means for transmitting to the output element the summed displacement produced by the last of said additional differential gear means, the overall transmission ratio of the communicating means between the input element and the output element for each independent variable being equal to the negative ratio of the exponent of that independent variable to the exponent of the dependent variable.

6. Apparatus for evaluating a dependent variable A for particular values of one or more independent variables B, C . . ., the variables being related by an expression convertible to the general form $A \cdot B^b \cdot C^c =$ constant, where at least one of the exponents $b, c \ldots$ is rational or irrational and other than 1, which apparatus comprises a displaceable input element for each of the variables B, C . . ., means for producing a displacement of each input element related to the logarithm of the associated independent variable, a displaceable output element for the dependent variable A, means for relating the displacement of the output element to the value of the dependent variable, and means for communicating the displacement of each input element to the output element, said communicating means comprising a gear means for each input element for multiplying the displacement of that element, one differential gear means for algebraically summing the multiplied displacements produced by the gear means for two of said input elements, another differential gear means for algebraically summing the multiplied displacement produced by another of said gear means and the summed displacements produced by said one differential gear means, an additional differential gear means for each of the other gear means for algebraically summing the multiplied displacement produced by each other gear means and the summed displacements produced by the preceding differential gear means, a final gear means for multiplying the summed displacements produced by the last of said additional gear means and means for transmitting to the output element the multiplied displacement produced by said final gear means, the overall transmission ratio of the communicating means between the input element for each independent variable and the output element for the dependent variable being equal to the negative ratio of the exponent of that independent variable and the exponent of the dependent variable.

7. Apparatus according to claim 1 and another apparatus of substantially similar character for evaluating a dependent variable S for particular values of one or more independent variables T, U . . ., the variables being related by an expression convertible to the general form $S \cdot T^t \cdot U^u =$ constant, where at least one of the exponents $t, u, \ldots$ is rational or irrational and other than 1, at least one of the input elements and the associated relating means for the variables B, C, . . . also being the input element and associated relating means for one of the variables T, U, . . .

8. Mechanical analog computing apparatus for solving equations reducible to the form $A \cdot B^b \cdot C^c =$ constant, where at least one of the exponents $b, c \ldots$ is rational or irrational and other than 1, which apparatus comprises a rotatable input shaft for each of the independent variables B and C and a rotatable output shaft for the dependent variable A, an indicating means for each input and each output shaft, said indicating means being coupled to its shaft through a reducing gear train, each of said indicating means being graduated so that the angular displacement of the shaft may be related to the logarithm of the variable represented thereby, a differential gear transmission comprising a ring gear and planet gears carried internally of the ring gear and a pair of opposed crown gears, the ring gear being driven from the input shaft for the independent variable B through a reducing gear transmission having a transmission ratio $k_2$, one crown gear being driven from the input shaft for the independent variable C through a reducing gear transmission having a transmission ratio $k_3$, and the second crown gear driving the output shaft for the dependent variable A through a reducing gear transmission having a transmission ratio $k_1$, said transmission ratios being related by the equations $2k_1 \cdot k_2 = -b$ and $k_1 \cdot k_3 = c$.

9. Mechanical analog computing apparatus for solving equations reducible to the form $A \cdot B^b \cdot C^c \cdot D^d =$ constant, where at least one of the exponents $b, c, d \ldots$ is rational or irrational and other than 1, which apparatus comprises a rotatable input shaft for each of the independent variables B, C, D and a rotatable output shaft for the dependent variable A, an indicating means for each shaft, said indicating means being coupled to its shaft through a reducing gear train, each of said indicating means being graduated so that the angular displacement of the shaft may be related to the logarithm of the variable represented thereby, a first differential gear transmission comprising a ring gear and planet gears carried internally of said ring gear and a pair of opposed crown gears meshing with said planet gears, the ring gear of said first transmission being driven by the input shaft for the independent variable B through a first reducing gear transmission having a transmission ratio $k_2$, one crown gear of said first differential transmission driving the output shaft for the dependent variable A through a second reducing gear transmission having a transmission ratio $k_1$, a second differential gear transmission having a ring gear and planet gears carried internally of the ring gear and a pair of opposed crown gears meshing with said planet gears, the second crown gear of said first differential transmission being coupled to one of the crown gears of said second differential gear transmission, the ring gear of said second differential gear transmission being driven from the input shaft for the independent variable C through a third reducing gear transmission having a transmission ratio $k_3$, and the second crown gear of the second differential gear transmission being driven by the input shaft for the independent variable D through a fourth reducing gear transmission having a transmission ratio $k_4$, and said transmission ratios being related by the equations $$2k_1 \cdot k_2 = -b, \ 2k_1 \cdot k_3 = c, \text{ and } k_1 \cdot k_4 = -d$$

10. Mechanical analog computing apparatus for solving equations of the form $$X = p \cdot N^{\frac{a}{b}}$$

which apparatus comprises a rotatable input shaft for each of the independent variables $p$ and N and a rotatable output shaft for the dependent variable X, an indicating means for each shaft and coupled thereto through a reducing gear train, each of said indicating means being graduated to express the displacement of the shaft coupled thereto as the logarithm of the value of the variable represented thereby, a first worm and gear transmission driven by the shaft for the variable $p$ and having a transmission ratio $k_1$, a second worm and gear transmission driven by the input shaft for the variable N and having a transmission ratio $$k_2 = k_1 \cdot \frac{a}{2b}$$

a differential gear transmission comprising a ring gear and planet gears carried internally of the ring gear and a pair of opposed crown gears meshing with said planet gears, the ring gear being driven by the worm of said second transmission, means for coupling the gear of said first transmission to one crown gear of said differential transmission, a third worm and gear transmission having a transmission ratio $k_3$ and having its worm coupled to the other crown gear of said differential transmission, the gear of said third transmission being coupled to said output shaft, and the ratios of the reductions effected by the input indicating means gear trains to the reduction effected by the output indicating means gear train being the product of $k_1$ and $k_3$.

11. Mechanical analog computing apparatus for solving equations of the form $$t = K \cdot p^{-1} \cdot N^{\frac{-a}{b}}$$

which apparatus comprises a rotatable input shaft for each of the independent variables $p$, N and K and a rotatable output shaft for the dependent variable $t$, an indicating means for each shaft and coupled thereto through a reducing gear train, each of said indicating means being graduated to express the angular displacement of the shaft coupled thereto as the logarithm of the value of the variable represented thereby, a first worm and gear transmission driven by the input shaft for the variable $p$ and having a transmission ratio $k_1$, a second worm and gear transmission driven by the input shaft for the variable N and having a transmission ratio $$k_2 = \frac{k_1 a}{2b},$$

a third worm and gear transmission driven by the input shaft for the variable K and having a transmission ratio $$k_3 = \frac{k_1}{2}$$

differential gear transmissions driven by said second and third transmissions, each of said differential gear transmissions comprising a ring gear carrying internal planet gears and a pair of opposed crown gears meshing with said planet gears, the ring gear of each differential transmission being the gear of the associated worm and gear transmission, means for coupling the gear of said first transmission to one crown gear of the differential transmission associated with said second transmission and means for coupling the other crown gear to one crown gear of the differential transmission associated with said third transmission, a fourth worm and gear transmission having a transmission ratio $k_4$ and means for coupling the worm thereof to the other crown gear of the differential transmission associated with said third transmission, means for coupling the gear of said fourth transmission to the output shaft for the variable $t$, the ratio of the reduction effected by the input indicating means gear train to the reduction effected by the output indicating means gear train being equal to the product of $k_1$ and $k_4$.

12. Mechanical analog computing apparatus for simultaneously solving expressions reducible to the form $A \cdot B^b \cdot C^c =$ constant, and $S \cdot B^m \cdot T^t =$ constant, where at least one of the exponents $b, c, \ldots m, t$ is rational or irrational and other than 1, which apparatus comprises a displaceable input element for each of the independent variables B, C $\ldots$, S, T, $\ldots$, and a displaceable output element for each of the dependent variables A, S, $\ldots$, means for effecting a displacement of each input element related to the logarithm of the value of the associated independent variable, means for relating the displacement of each output element to the value of the associated dependent variable, means for communicating the displacement of each of the input elements for the independent variables B, C, $\ldots$ to the output element for the dependent variable A and other means for communicating the displacement of each of the input elements for the independent variables B, T, $\ldots$ to the output element for the dependent variable S, each of said communicating means operating to multiply the displacement of the particular input element by the negative ratio of the exponent of the independent variable associated with that input element to the exponent of the dependent variable to which the multiplied displacement is communicated, and each of said communicating means further operating to sum algebraically the multiplied displacements communicated to the output element.

13. Computing apparatus according to claim 12 in which each of said communicating means comprises separate gear means for multiplying the displacement of each of the input elements the displacement of which is communicated, and differential gear means for summing algebraically the multiplied displacements of said input elements, the overall transmission ratio of the communicating means between each of the input elements and the output element being equal to the negative ratio of the exponent of the independent variable associated with the particular input element to the exponent of the dependent variable associated with the output element to which the displacement is communicated.

14. Mechanical analog computing apparatus for simultaneously evaluating dependent variables A, M, S for particular values of independent variables B, C, . . ., M, N, . . . T, U, . . ., the variables being related by expressions reducible to the general forms $$A \cdot B^b \cdot C^c = \text{constant}$$
$$M \cdot B^e \cdot C^f \cdot N^n = \text{constant, and } S \cdot B^o \cdot C^p \cdot T^t \cdot U^u = \text{constant}$$

where at least one of the exponents $b, c, e, f, n, o, p, t, u, \ldots$ is rational or irrational other than 1, which apparatus comprises a displaceable input element for each of the independent variables B, C, . . . M, N, . . . T, U, . . ., and a displaceable output element for each of the dependent variables A, M, S, . . ., means for effecting a displacement of each input element related to the logarithm of the value of the associated independent variable, means for relating the displacement of each output element to the value of the associated dependent variable, means for communicating the displacement of each of the input elements for the independent variables B, C to the output element for the dependent variable A, other means for communicating the displacement of each of the input elements for the independent variables B, C, N to the output element for the dependent variable M, and further means for communicating the displacement of each of the input elements for the independent variables B, C, T, U to the output element for the dependent variable S, each of said communicating means operating to multiply the displacement of the particular input element by the negative ratio of the exponent of the independent variable associated with that input element to the exponent of the dependent variable to which the multiplied displacement is communicated, and each of said communicating means further operating to sum algebraically the multiplied displacements communicated to the output element.

15. Computing apparatus according to claim 14 in which each of said communicating means comprises separate gear means for multiplying the displacement of each of the input elements the displacement of which is communicated, and differential gear means for summing algebraically the multiplied displacements of said input elements, the overall transmission ratio of the communicating means between each of the input elements and the output element being equal to the negative ratio of the exponent of the independent variable associated with the particular input element to the exponent of the dependent variable associated with the output element to which the displacement is communicated.

References Cited in the file of this patent

UNITED STATES PATENTS

| 1,070,835 | Nowak | Aug. 19, 1913 |
| 1,979,512 | Wasson | Nov. 6, 1934 |

FOREIGN PATENTS

| 865,318 | France | May 20, 1941 |
| 774,341 | Great Britain | May 8, 1957 |

OTHER REFERENCES

Product Engineering, p. 122, September 1949; pp. 126 and 127, October, 1949, and pp. 121–124, November 1949 ("Mechanical Computing Mechanisms," Reid and Stromback).

UNITED STATES PATENT OFFICE
CERTIFICATE OF CORRECTION

Patent No. 3,027,069                              March 27, 1962

Örnulf E. Heiberg

It is hereby certified that error appears in the above numbered patent requiring correction and that the said Letters Patent should read as corrected below.

Column 1, line 61, for "many" read -- any --; column 8, line 45, strike out "$M(N,m)=300 \cdot (-1/60) \cdot 2 \cdot (-1/5) \cdot 1/12=1/6$"; column 9, line 24, for "$M(Y,S=1$" read -- $M(Y,S)=1$ --.

Signed and sealed this 3rd day of July 1962.

(SEAL)
Attest:

ERNEST W. SWIDER
Attesting Officer

DAVID L. LADD
Commissioner of Patents